(12) United States Patent
Zhang et al.

(10) Patent No.: US 8,283,140 B2
(45) Date of Patent: Oct. 9, 2012

(54) CONVERSION OF KNOT REJECTS FROM CHEMICAL PULPING

(75) Inventors: Xiao Zhang, Richland, WA (US); Zhi-Hua Jiang, Kirkland (CA)

(73) Assignee: FPINNOVATIONS, Pointe Claire (CA)

( * ) Notice: Subject to any disclaimer, the term of this patent is extended or adjusted under 35 U.S.C. 154(b) by 12 days.

(21) Appl. No.: 12/734,930

(22) PCT Filed: Dec. 16, 2008

(86) PCT No.: PCT/CA2008/002184
§ 371 (c)(1),
(2), (4) Date: Jun. 3, 2010

(87) PCT Pub. No.: WO2009/076760
PCT Pub. Date: Jun. 25, 2009

(65) Prior Publication Data
US 2010/0240104 A1   Sep. 23, 2010

Related U.S. Application Data

(60) Provisional application No. 61/006,101, filed on Dec. 19, 2007.

(51) Int. Cl.
*C12P 19/02* (2006.01)
*C12P 7/06* (2006.01)

(52) U.S. Cl. .................................. 435/105; 435/161

(58) Field of Classification Search .................. 435/105, 435/161
See application file for complete search history.

(56) References Cited

U.S. PATENT DOCUMENTS

| | | | |
|---|---|---|---|
| 3,393,121 A | 7/1968 | Lea et al. | |
| 3,972,775 A | 8/1976 | Wilke et al. | |
| 4,002,528 A | 1/1977 | Laakso | |
| 4,230,524 A | 10/1980 | Hasvold | |
| 4,278,471 A | 7/1981 | Whittingham | |
| 4,435,249 A | 3/1984 | Markham et al. | |
| 4,564,595 A | 1/1986 | Neves et al. | |
| 4,612,286 A | 9/1986 | Sherman et al. | |
| 4,681,935 A | 7/1987 | Forss et al. | |
| 4,840,903 A | 6/1989 | Wu | |
| 5,198,074 A | 3/1993 | Villavicencio et al. | |
| 5,628,830 A | 5/1997 | Brink | |
| 5,672,245 A | 9/1997 | Andtbacka et al. | |
| 2003/0102093 A1 | 6/2003 | Stromberg | |
| 2004/0199032 A1* | 10/2004 | Holmbom et al. | ............ 585/242 |

FOREIGN PATENT DOCUMENTS

| | | |
|---|---|---|
| CA | 1051803 | 4/1979 |
| CA | 1190923 | 7/1985 |
| CA | 2541768 | 5/2005 |

OTHER PUBLICATIONS

Helle et al. (Fortifying spent sulfite pulping liquor with hydrolyzed reject knots. Enzyme and Microbial Technology 41:44-50; Available online Dec. 1, 2006).*

Helle, S. S. et al: "Fortifying Spent Sulfite Pu,pin Liquor with Hydrolyzed Reject Knots", Enzyme and Microbial Technology, vol. 41, pp. 44-50, Jul. 2, 2007.

Energetics Incorporated (2003) Industrial Bioproducts: Today and Tomorrow, U.S. Department of Energy, Office of Energy Efficiency and Renewable Energy, Office ofthe Biomass Program, Washington, D.C.

Stefan Willfor et al: "Bioactive Phenolic Substances in Industrially Important Tree Species, Part 1: Knots and Stemwood of Different Spruce Species", Holzforschung, vol. 58, pp. 335-344 (2004).

* cited by examiner

*Primary Examiner* — Karen Cochrane Carlson
*Assistant Examiner* — Natalie Moss
(74) *Attorney, Agent, or Firm* — Norton Rose Canada LLP

(57) ABSTRACT

Knot rejects from chemical pulping processes are subjected to acid hydrolysis or an enzymatic hydrolysis treatment. The resultant hydrolysate is enriched with glucose, representing a value-added raw material for products using hexoses. The residue, separated from the said hydrolysate after the acid hydrolysis or enzyme treatment, consists of mainly knots or chips. The residue has a much improved aesthetic appearance which can be readily used as value-added raw materials for mulch or similar applications. The residue could also be extracted to obtain high value antioxidants and other nutraceutical chemicals such as lignans or can be utilized according to currently known practices including recooking, burning and depositing.

20 Claims, 7 Drawing Sheets

CONVERSION OF KNOT REJECTS FROM CHEMICAL PULPING

CROSS-REFERENCE TO RELATED APPLICATIONS

This application is a National entry of PCT/CA2008/002184 filed Dec. 16, 2008, in which the United States of America was designated and elected, and which remains pending in the International phase until Jun. 19, 2010, which application in turn claims priority under 35 USC 119(e) from U.S. Provisional application Ser. No. 61/006,101 filed Dec. 19, 2007.

TECHNICAL FIELD

This invention relates to a method for converting knot rejects from a chemical pulping process into glucose-based products and other value-added products; and to the products from the method.

BACKGROUND ART

Rejects from screening of pulp after a chemical cooking process (e.g. kraft, sulphite) usually consist of rejects comprising botanical knots, with lignocellulosic fibres, and insufficiently cooked chips; and a variable amount of desired fibres. Depending on conditions of cooking and chip quality, the amount of rejects varies and can constitute about 2% of the incoming chips. Currently, the rejects, especially those from a sulphite pulping process, are in general not adequately utilized as they are either burned or land-filled. U.S. Pat. No. 4,230,524 discloses a method for the production of unbleached sulphite cellulose or bleached cellulose from a defibrated knot pulp [1]. Kraft pulping is a predominant pulping method employed worldwide. There is no information relating to a process to convert knot rejects to any non-fibre-based value added products.

DISCLOSURE OF THE INVENTION

It is an object of the invention to produce value-added products from rejects from chemical pulping.

It is another object of the invention to provide a process for producing such value-added products.

It is still another object of the invention to provide value-added products derived from hydrolysis of rejects of chemical pulping.

In one aspect of the invention, there is provided a process comprising hydrolysing rejects from chemical pulping to produce value-added products.

In another aspect of the invention, there is provided a hydrolysate of hydrolysis of rejects from chemical pulps, rich in glucose.

In particular the rejects are botanical knots with lignocellulosic fibres attached.

In still another aspect of the invention, there is provided a botanical knot residue of aesthetic appearance as a by-product of hydrolysis of rejects from chemical pulping.

In a specific embodiment, the present invention provides an integrated bioconversion process to convert knot rejects to several value added products. The bioconversion may involve the following major steps: a) hydrolysis of a cellulose fraction in knot rejects by either enzymes or acid; b) fermenting the ensuing glucose to biofuel ethanol and biopolymer precursors (e.g. lactic acid, 1,3 propanediol), and c) extracting unhydrolysable residues to obtain high value antioxidant, or direct application of residues for mulch and composting.

Hydrolysing the knot rejects from chemical pulping is found to render the resulting knot residues from the hydrolysis, more susceptible or amenable to extraction of chemicals such as lignans and phenolics from the knot residues as compared with the botanical knots present in wood chips prior to chemical pulping; and as compared to knot rejects from chemical pulping prior to the hydrolysis of the invention.

It was surprising that value products could readily be obtained by the simple hydrolysis in accordance with the invention. In general it is preferred to remove knots from wood chips prior to chemical pulping because the compact structure of the knots renders them difficult to process chemically for recovery of any fibres in the knots. It is now found that while knots themselves are difficult to process chemically such as in chemical pulping, the knot residues resulting from the unsuccessful chemical pulping of knots are surprisingly susceptible to simple acid or enzyme hydrolysis.

DETAILED DESCRIPTION WITH REFERENCE TO THE DRAWINGS

Figure 1:
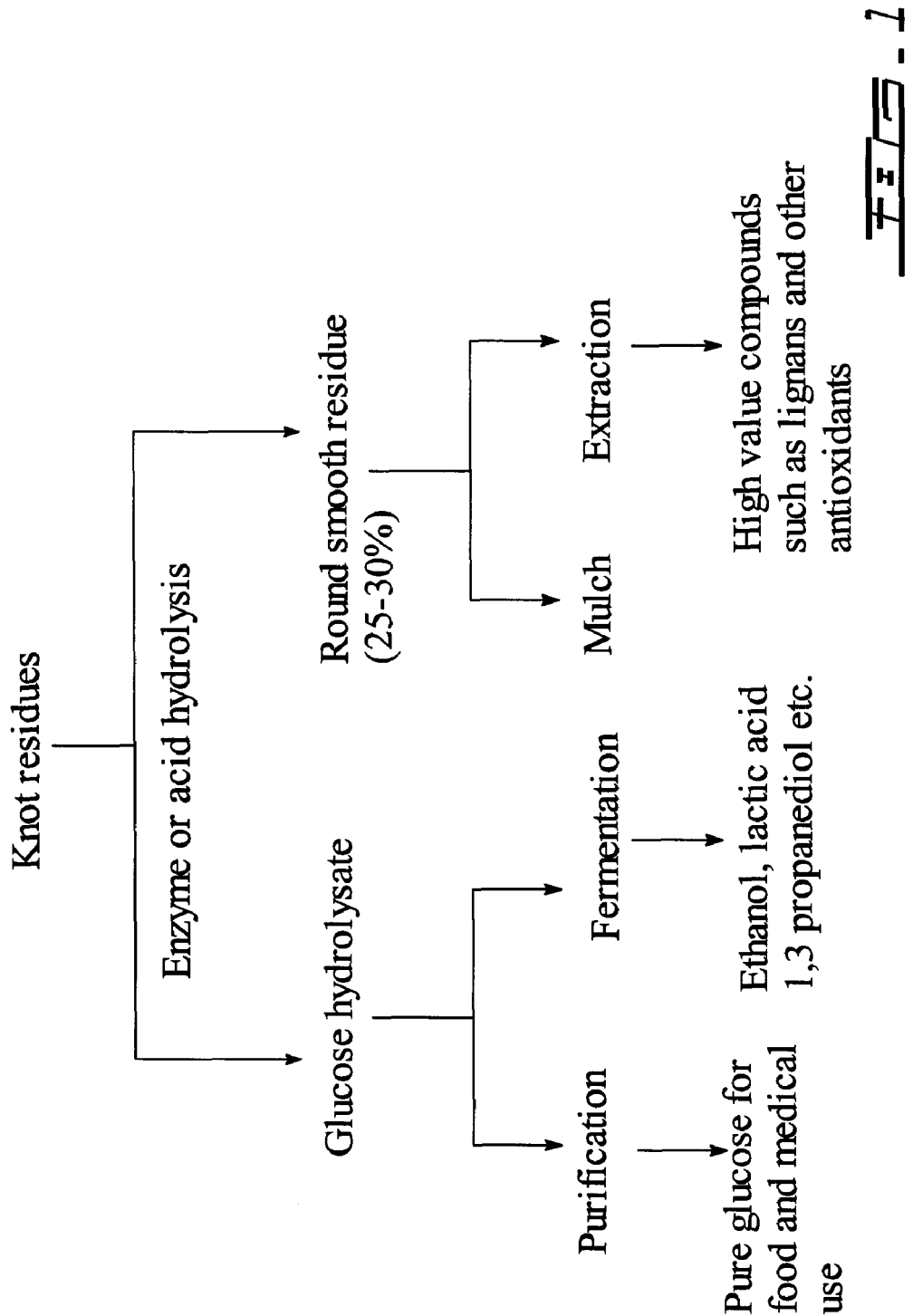
FIG. 1 is a flow sheet illustrating processes of the invention to produce value-added products for knot residues from chemical pulping.

With further reference to FIG. 1 there is illustrated a method of the invention in which method, knot rejects collected after knot screening from a chemical pulp mill are first subjected to an acid hydrolysis or an enzymatic treatment using a mixture of hydrolytic enzymes. The hydrolysis hydrolyses the carbohydrate fraction present in the knot rejects. The resultant hydrolysate is rich in glucose, representing a valuable intermediate material for producing high value industrial chemicals and biofuel, such as ethanol, lactic acid, 1,3 propanediol, polyhydroxyalkanoates (PHAs) etc. by fermentation [2]. The hydrolysate could also be purified to obtain pure glucose for food and medical applications. On the other hand, the knot residues after the hydrolysis have a much improved aesthetic appearance and can be readily used as value-added raw materials for mulch or similar applications. In addition, knots are known to have a high content of phenolics [3] and therefore, the knot residue can be extracted to obtain high value antioxidants and other nutraceutical chemicals such as lignans. This extraction could be applied to the knot residue prior to the utilization as value-added raw materials for mulch or similar applications. The knot residue can also be utilized according to currently known practices including recooking, burning and depositing. In the case of acid hydrolysis, inorganic acids are typically employed to hydrolyze cellulose in the knots.

Figure 2:
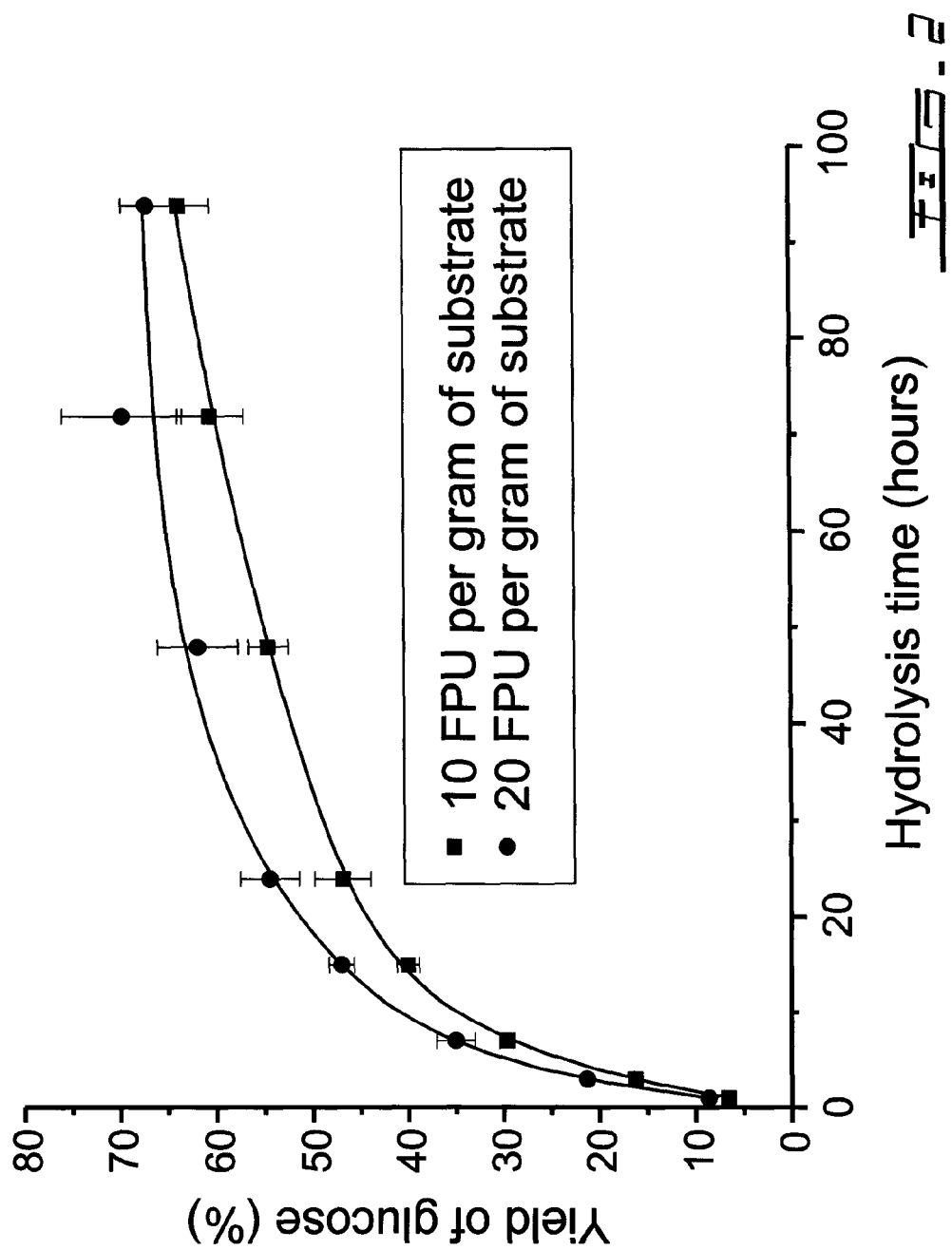
FIG. 2 illustrates graphically yield of glucose by cellulose hydrolysis of knot rejects at 2% substrate consistency.

FIG. 2 demonstrates that the knot rejects are very susceptible to enzymatic hydrolysis at two cellulase dosages, 10 and 20 filter paper unit (FPU) per gram of cellulose.

Figure 3:
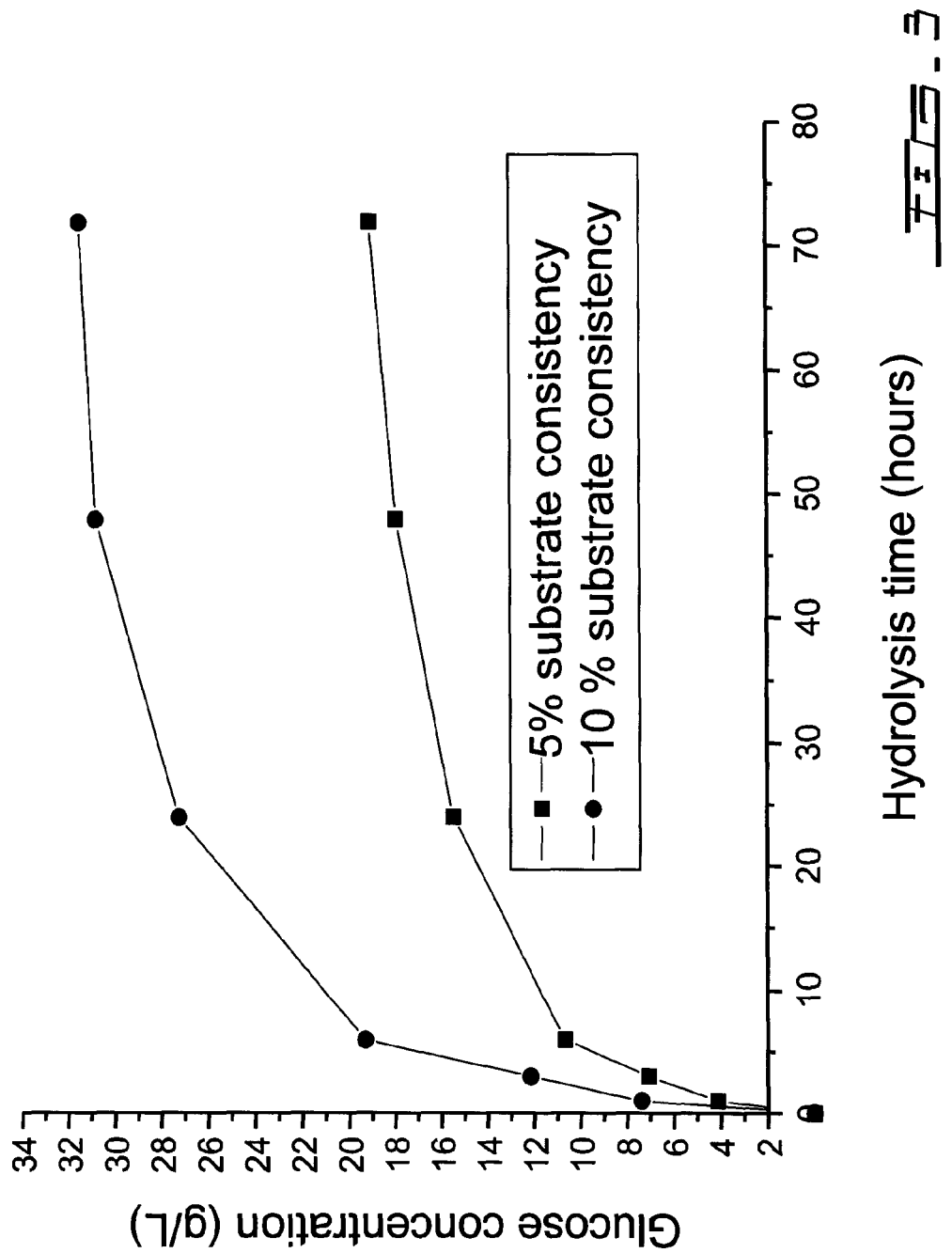
FIG. 3 illustrates graphically the yield of glucose by cellulose hydrolysis of knot rejects at 5% and 10% substrate consistencies.

FIG. 3 demonstrates that the knot rejects can be hydrolyzed at 5% and 10% substrate consistencies with a cellulase enzyme dosage of 20 FPU. It appears that increasing substrate loading during hydrolysis leads to increased glucose concentration, and consequently higher final ethanol content after fermentation. This approach brings about economic savings to the bioconversion process, such as reducing capital and operational cost for hydrolysis and fermentation, and minimizing energy consumption during distillation/evaporation and other downstream processes.

Figure 4:
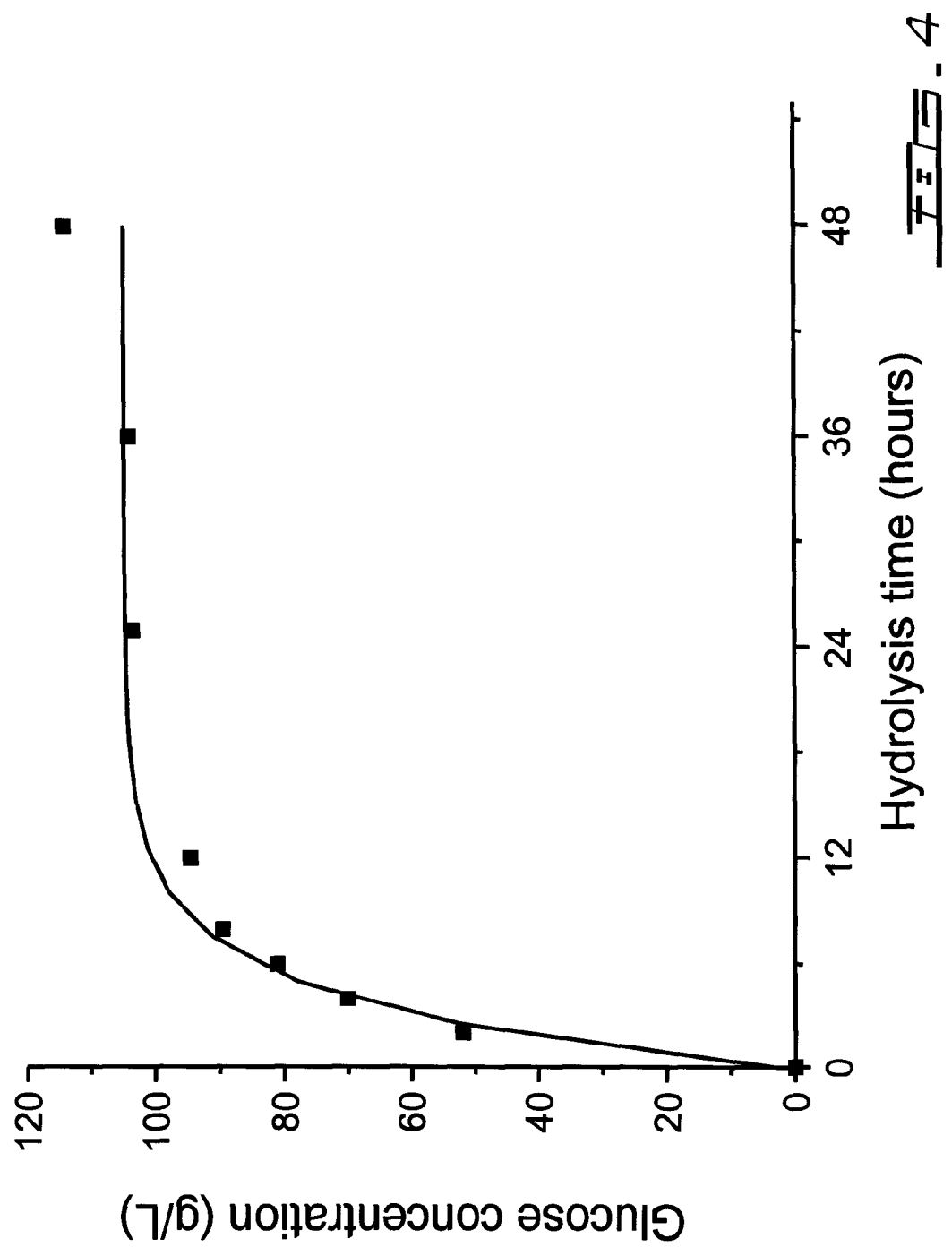
FIG. 4 illustrates graphically the yield of glucose by enzymatic hydrolysis of knot rejects, at 20% consistency, in a pilot scale vessel.

In order to determine the feasibility of carrying out enzymatic hydrolysis at an industrial scale, cellulase hydrolysis of knot rejects at high substrate consistency was carried out in a 5 kg-capacity pilot scale vessel. As shown in FIG. 4, a significant high final glucose concentration was achieved after 48 hours of cellulase hydrolysis of knot rejects at 20% solid concentration. The final glucose concentration in the hydrolysate reached over 100 g/L. This is the highest glucose concentration derived from lignocellulosic materials that has ever been reported in the literature. The high glucose concentration greatly enhances the efficiency of subsequent fermentation of glucose to ethanol.

Figure 5:
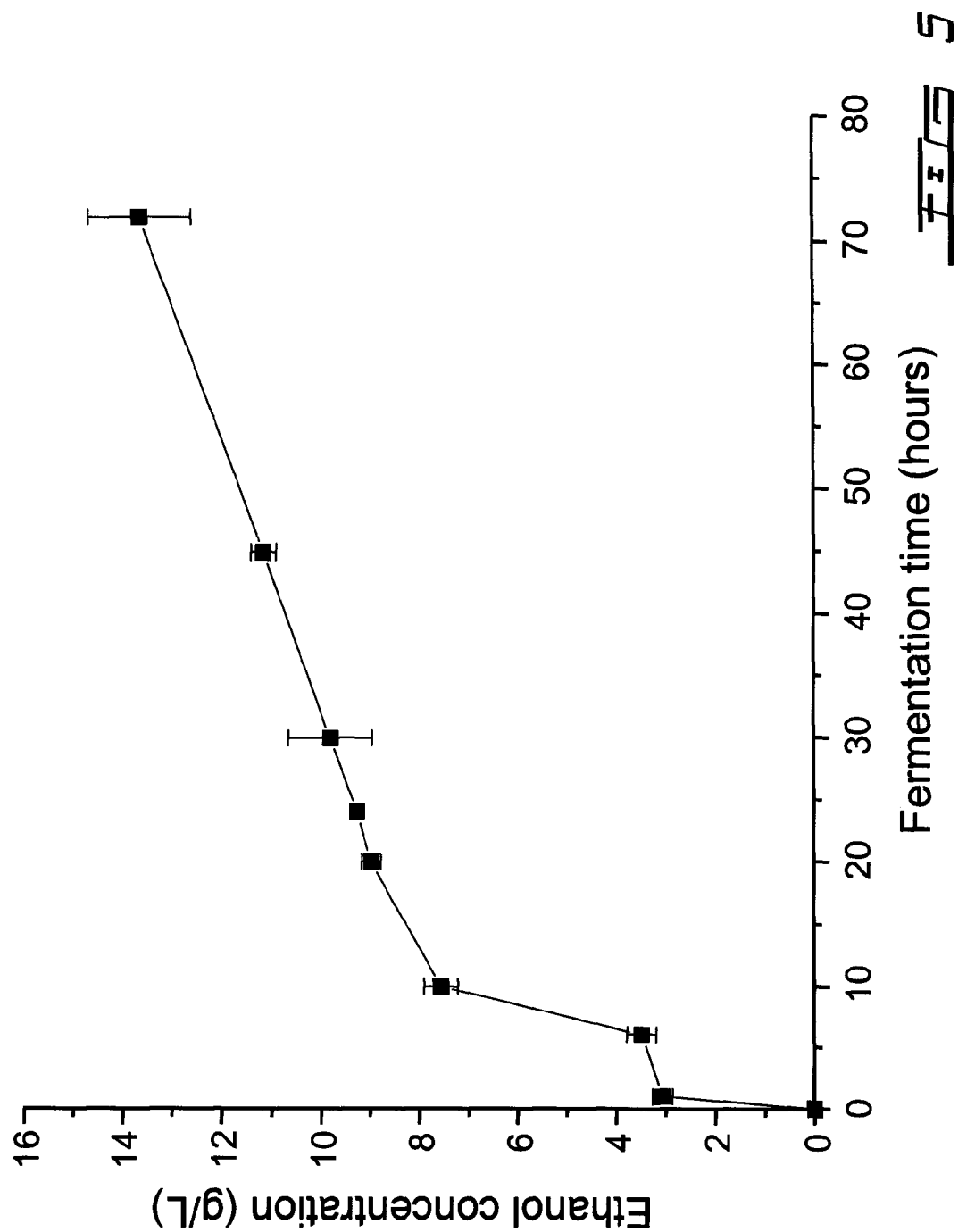
FIG. 5 illustrates graphically the yield of ethanol by fermentation of a hydrolysate of knot rejects.

FIG. 5 illustrates the fermentability of the hydrolysate obtained from knot rejects. As shown in FIG. 5, the hydrolysate resulting from above described hydrolysis carried out by enzyme hydrolysis was fermented by industrial yeast (*Saccharomyces cerevisiae*) to reach an ethanol concentration above 12 g/L. The potential inhibitors present in knot hydrolysate were also determined. There is a negligible amount of acetic acid and furfural detected by HPLC analysis. However, there is an appreciable amount of phenolic compounds present in the knot hydrolysate at 0.67% w/v. The knot hydrolysate can be fermented to 1,3 propandiol and lactic which can then be polymerized to produce biodegradable biopolymers.

Figure 6:
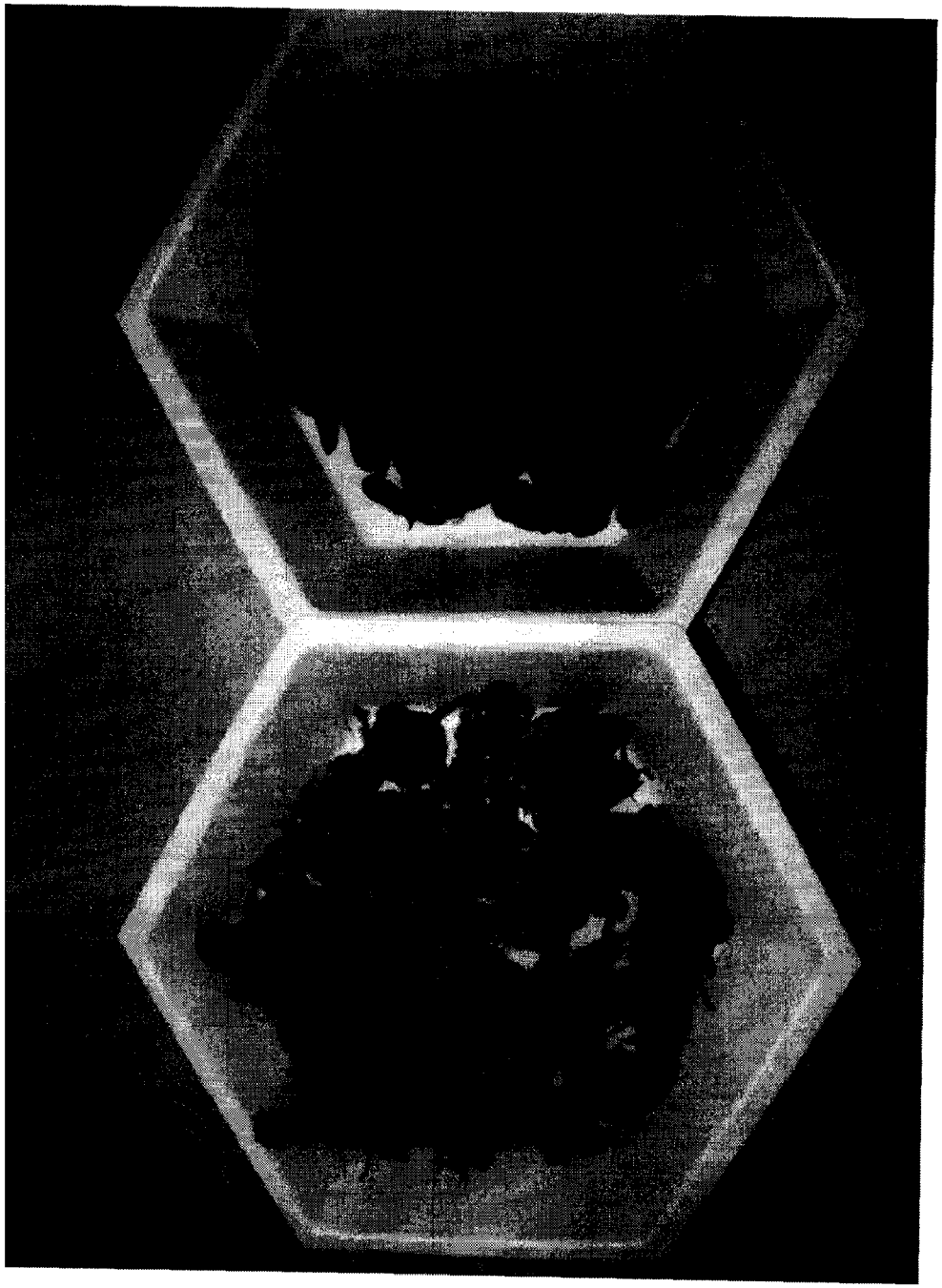
FIG. 6 is a photograph of knot rejects (left) prior to hydrolysis, in accordance with the invention, and after (right) such hydrolysis.

FIG. 6 shows the knot rejects before (left) and after (right) enzyme hydrolysis. The knot residues after the enzyme treatment have a much improved aesthetic appearance rendering them suitable for use as value-added raw materials for mulch or similar applications. The amount of the residue represents approximately 30% of the initial rejects on a weight basis after 24 hours treatment. The residue can also be utilized according to currently known practices including recooking, burning and depositing. The hydrolysis, for example enzymatic hydrolysis, also serves as a pretreatment step for separating high value phenolic compounds from knots rejects. After such enzymatic hydrolysis the total phenolics content of the residues increased to 50%, by weight.

Figure 7:
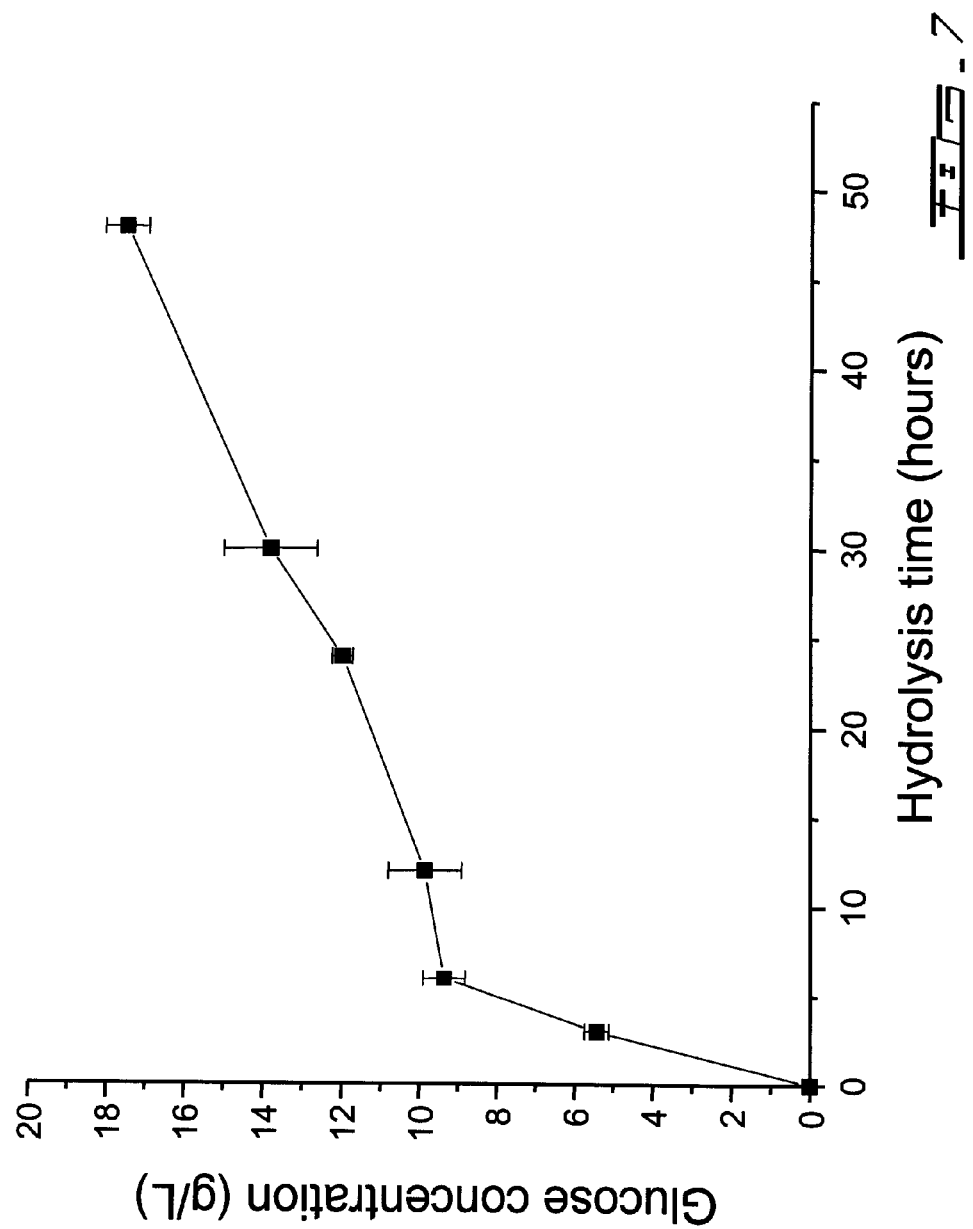
FIG. 7 illustrates graphically the glucose yield by hydrolysis, in accordance with the invention, of knot rejects from kraft pulping.

FIG. 7 demonstrates the susceptibility to hydrolysis of knot rejects from a kraft pulping process. As shown in FIG. 7, a knot rejects sample obtained from kraft pulping process is susceptible to the enzymatic hydrolysis under typical hydrolysis conditions: 20 FPU/g enzyme loading, 45° C., 5% substrate consistency. Over 17 g/L of glucose was produced with 48 hours of hydrolysis.

DETAILED DESCRIPTION OF THE INVENTION

The present invention provides conversion of knot rejects into value-added products. These products include, but are not limited to, sugar monomers, sugar oligomers, ethanol, intermediates for polymers, lignans and antioxidative agents.

The hydrolysis of the invention can be carried out with an enzyme or enzymes or with an acid.

Enzyme hydrolysis of cellulose to glucose is a multi-step reaction. Cellulase is a mixture of several enzymes produced mainly from fungi, bacteria and plants. A complete cellulase system for cellulose hydrolysis includes at least three groups of enzyme: 1) Endo-glucanase is a group of enzymes which breaks internal bonds to disrupt the crystalline structure of cellulose and expose individual cellulose polysaccharide chains, 2) Exo-glucanase (or cellobiohydrolase) is a group of enzymes which cleaves 2-4 units from the ends of the exposed chains produced by endo-glucannase, resulting in the tetrasaccharides or disaccharide such as cellobiose; 3) beta-glucosidase (or cellobiase) is a group of enzymes which hydrolyses the exo-cellulase product into individual monosaccharides. Besides, these three major groups, several minor enzyme components also exist in the cellulase mixture to enhance cellulose hydrolysis at various steps. These components may have activities which reduce the cellulose crystallinity and depolymerize cellulose through oxidation, etc.

As an alternative to enzyme hydrolysis, acid hydrolysis can also be used to convert knot cellulose to glucose. A range of inorganic and organic acids which includes but not limited to hydrochloric acid, sulphuric acid, sulphonic acid, acetic acid, and formic acid, can be used.

The present invention can be illustrated by the scheme of FIG. 1 for the case in which enzymatic hydrolysis is employed. In this bioconversion process, knot rejects collected after knot screening from a chemical pulp mill are first subjected to an enzymatic treatment using a mixture of hydrolytic enzymes. The enzymatic treatment hydrolyses the carbohydrate fraction present in the knot rejects to form glucose. The resultant hydrolysate is rich in glucose which represents a valuable intermediate material for producing high value industrial chemicals and biofuel, such as ethanol, lactic acid, 1,3 propanediol, polyhydroxyalkanoates (PHAs) etc. by fermentation [2]. The hydrolysate could also be purified to obtain pure glucose for food and medical applications. On the other hand, the knot residues after the enzyme treatment have a much improved aesthetic appearance and can be readily used as value-added raw materials for mulch or similar applications. In addition, knots are known to have a high content of phenolics [3] and therefore, the knot residues could be extracted to obtain high value antioxidant and other nutraceutical chemicals such as lignans. Extracting lignans from untreated knots is a tedious and energy intensive process, due to the compact nature of the biological knot, and their intricate interactions with other wood components, such as cellulose, hemicellulose and extractives. Knot rejects, on the other hand, have gone through the chemical pulping process in which most of the wood components are separated. As shown in the examples, the cellulosic fiber attached on phenolic knot cores can be easily removed by hydrolysis providing a substrate that is enriched in phenolic compounds. This extraction could also be applied to the knot residues prior to their utilization as value-added raw materials for mulch or similar applications. The residues can also be utilized according to currently known practices including recooking, burning and depositing. The present invention is further illustrated, but not limited by, the following examples:

EXAMPLE 1

The knot samples were collected from the knotter, an equipment to separate knot rejects after chemical pulping stage. The knot samples were washed with water in the laboratory and analysed for chemical composition. It is readily evident from the results in Table I, that the knot rejects have a high content of glucose with a small amount of hemicellulose sugars.

TABLE 1

The chemical composition of unwashed and washed rejects from knot screening

| Concentration (%) | Unwashed samples | Washed sample |
|---|---|---|
| Extractives (acetone) | 1.9 | 1.8 |
| Lignin (acid insoluble) | 18.3 | 18.0 |
| Lignin (acid soluble) | 13.4 | 8.2 |
| Galactose | 0.4 | 0.2 |
| Glucose | 52.9 | 64.7 |
| Xylose | 3.7 | 4.4 |
| Mannose | 4.3 | 3.9 |

EXAMPLE 2

The sample of rejects described in Example 1 was subjected to an enzyme hydrolysis. A commercial cellulase (Celluclast 1.5 L) supplemented with a commercial beta-glucosidase (Novozyme 188) was used. The hydrolysis was carried out at 50° C., at a consistency varying between 2 to 10%, for a treatment time up to 95 hours. The pH was maintained at 4.5 and the enzyme loadings were between 10 FPU to 20 FPU per gram o.d. substrate.

It is readily evident from the results in Table II and FIGS. 2 and 3 that a large amount of cellulose in the rejects is found to be easily hydrolyzed by the treatment using a relatively low enzyme loading between 10 to 20 FPU (filter paper unit) per gram of oven-dried knot residue. The resultant hydrolysate is rich in glucose, representing a valuable intermediate material for producing high value industrial chemicals and biofuel, such as ethanol, lactic acid, 1,3 propanediol, polyhydroxyalkanoates (PHAs) etc.

TABLE II

The concentrations of glucose in the filtrates after enzymatic treatment for 6, 24 and 72 hours at different conditions.

| Treatment time | Concentration of glucose in the filtrate g/L | | | |
|---|---|---|---|---|
| | 2%* 10 FPU** | 2% 20 FPU | 5% 20 FPU | 10% 20 FPU |
| 6 hours | 3.91 | 5.72 | 11 | 19.38 |
| 24 hours | 6.34 | 7.32 | 15.5 | 27.4 |
| 72 hours | 8.14 | 9.58 | 17.9 | 30.7 |

*Substrate loading
**Enzyme loading FPU (filter paper unit)

EXAMPLE 3

To determine the feasibility of carrying out enzymatic hydrolysis on an industrial scale, cellulase hydrolysis of knot rejects at high substrate consistency was carried out in a 5 kg-capacity pilot scale vessel. As shown in FIG. 4, a significant high final glucose concentration was observed after 48 hours of cellulase hydrolysis of knot rejects at 20% solid concentration. The final glucose concentration in the hydrolysate reached over 100 g/L. This is the highest glucose concentration derived from lignocellulosic materials that has ever been reported in the literature. The high glucose concentration will greatly enhance the efficiency of subsequent fermentation of glucose to ethanol.

EXAMPLE 4

This example illustrates the fermentability of the knot rejects. As shown in FIG. 5, the hydrolysate resulting from the enzyme hydrolysis of Example 3 can be fermented by industrial yeast (*Saccharomyces cerevisiae*) to reach an ethanol concentration above 12 g/L. The potential inhibitors present in the knot hydrolysate were also determined. The hydrolysate was found to contain a negligible amount of acetic acid and furfural, detected by HPLC analysis. However, an appreciable amount of phenolic compounds was present in the knot hydrolysate at 0.67% w/v. The knot hydrolysate can also be fermented to 1,3 propanediol and lactic which can then be polymerized to produce biodegradable biopolymers.

EXAMPLE 5

Enzymatic hydrolysis also serves as a pretreatment step for separating high value phenolic compounds from knots rejects. After the enzymatic hydrolysis the total phenolics content of the residues (measured by soluble lignin+insoluble lignin) increased to 50%. FIG. 7 shows the rejects before (left) and after (right) enzyme hydrolysis. The knot residues after the enzyme treatment have a much improved aesthetic appearance rendering them suitable for use as value-added raw materials for mulch or similar applications. The amount of the residue represents approximately 30% of the initial rejects on a weight basis after 24 hours treatment. The said residue can also be utilized according to currently known practices including recooking, burning and depositing.

EXAMPLE 6

The susceptibility of knot rejects from a kraft pulping process is demonstrated in this example. As shown in FIG. 7, a knot rejects sample obtained from kraft pulping process is susceptible to the enzymatic hydrolysis at a typical hydrolysis condition: 20 FPU/g enzyme loading, 45° C., 5% substrate consistency. Over 17 g/L of glucose was produced with 48 hours of hydrolysis.

EXAMPLE 7

Production of glucose by acid hydrolysis of kraft knots was evaluated at 165° C. at different $H_2SO_4$ concentrations (0.1-1.5%), solids content (2-10%), and different hydrolysis times. The percentage of knot cellulose to glucose conversion obtained from several hydrolysis conditions is demonstrated in TABLE III. It is apparent that over 70% of the glucose can be extracted from the knot rejects by a one-step acid hydrolysis. Acid hydrolysis provides a quick and efficient method to extract glucose from knot rejects.

TABLE III

Cellulose-to-glucose conversion yield obtained by acid hydrolysis of a kraft knots sample at several conditions

| Samples | $H_2SO_4$ conc. (%) | Solid content (%) | Time (minutes) | Conversion yield (%) |
|---|---|---|---|---|
| 1 | 1 | 5 | 10 | 61.6 |
| 2 | 0.5 | 5 | 10 | 56.2 |
| 3 | 0.5 | 10 | 10 | 52.8 |
| 4 | 0.5 | 5 | 20 | 57.7 |

TABLE III-continued

Cellulose-to-glucose conversion yield obtained by acid hydrolysis of a kraft knots sample at several conditions

| Samples | $H_2SO_4$ conc. (%) | Solid content (%) | Time (minutes) | Conversion yield (%) |
|---|---|---|---|---|
| 5 | 1 | 10 | 20 | 55.7 |
| 6 | 0.5 | 5 | 20 | 70.8 |
| 7 | 0.5 | 0.1 | 10 | 60.1 |
| 8 | 1 | 2 | 10 | 57.2 |
| 9 | 0.5 | 2 | 10 | 58.7 |
| 10 | 0.5 | 2 | 20 | 63.1 |
| 11 | 1 | 2 | 20 | 64.5 |
| 12 | 1.5 | 2 | 20 | 58.7 |

Unless otherwise indicated, all percentages herein are by weight.

REFERENCES

1. Hasvold, K., U.S. Pat. No. 4,230,524, 1980.
2. Energetics Incorporated. 2003. Industrial Bioproducts: Today and Tomorrow, U.S. Department of Energy, Office of Energy Efficiency and Renewable Energy, Office of the Biomass Program, Washington, D.C.
3. Willför, S., Reunanen, M., Eklund, P., Sjöholm, R., Kronberg, L., Fardim, P., Pietarinen, S., and Holmbom, B., *Holzforschung*, 58:345-554, 2004.

The invention claimed is:

1. A process comprising:
recovering intact botanical knot rejects which have been subjected to chemical pulping, and
hydrolysing a carbohydrate fraction of said intact rejects to produce value-added products.

2. A process according to claim 1, wherein said rejects comprise screened botanical knot rejects collected after knot screening the pulp from a chemical pulp mill.

3. A process according to claim 1, wherein said value-added products comprise glucose.

4. A process according to claim 1, wherein said value-added products comprise botanical knot residues.

5. A process according to claim 1, wherein said hydrolysis is enzymatic hydrolysis.

6. A process according to claim 1, wherein said hydrolysis is acid hydrolysis.

7. A process according to claim 3, including recovering said glucose as a final product.

8. A process according to claim 3, including employing said glucose in the production of chemicals or biofuel, by fermentation.

9. A process according to claim 1, including a step of extracting intact knot residues recovered from the hydrolysis, to obtain antioxidants and nutraceuticals.

10. A process according to claim 1, wherein said hydrolysis is at a botanical knot rejects solids content of greater than 10%, by weight.

11. A hydrolysate from hydrolysis of intact botanical knot rejects which have been subjected to chemical pulping, said hydrolysate being rich in glucose.

12. An intact botanical knot residue as a by-product of hydrolysis of botanical knot rejects which have been subjected to chemical pulping, produced by the process of recovering botanical knot rejects which have been subjected to chemical pulping, and hydrolysing a carbohydrate fraction of said rejects.

13. A process according to claim 2, wherein said value-added products comprise glucose.

14. A process according to claim 2, wherein said value-added products comprise botanical knot residues.

15. A process according to claim 2, wherein said hydrolysis is enzymatic hydrolysis.

16. A process according to claim 2, wherein said hydrolysis is acid hydrolysis.

17. A process according to claim 3, including recovering said glucose as a final product.

18. A process according to claim 3 including employing said glucose in the production of chemicals or biofuel, by fermentation.

19. A process according to claim 2, including a step of extracting intact knot residues recovered from the hydrolysis, to obtain antioxidants and nutraceuticals.

20. A process according to claim 2, wherein said hydrolysis is at a botanical knot rejects solids content of greater than 10%, by weight.

* * * * *